(12) United States Patent
Marshall et al.

(10) Patent No.: US 7,942,224 B2
(45) Date of Patent: May 17, 2011

(54) LAWN MOWER WITH SUSPENDED ERGONOMIC SEAT

(75) Inventors: James F. Marshall, Munnsville, NY (US); Matthew R. Hatch, Canastota, NY (US); Derrick R. Camenga, Sherburne, NY (US); Joshua S. Williams, Deansboro, NY (US); William J. Decker, Vernon, NY (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 380 days.

(21) Appl. No.: 12/214,023

(22) Filed: Jun. 16, 2008

(65) Prior Publication Data

US 2009/0308039 A1 Dec. 17, 2009

(51) Int. Cl.
*B62D 33/10* (2006.01)
(52) U.S. Cl. ............ 180/89.13; 180/315; 180/326; 180/273; 180/334
(58) Field of Classification Search ............ 180/315, 180/333, 334, 89.13, 326, 273
See application file for complete search history.

(56) References Cited

U.S. PATENT DOCUMENTS

| | | | |
|---|---|---|---|
| 1,882,315 A * | 10/1932 | Clayton | 244/122 R |
| 3,485,314 A | 12/1969 | Herr | |
| 3,506,080 A | 4/1970 | Hott et al. | |
| 3,664,453 A * | 5/1972 | Cottrell et al. | 180/273 |
| 3,664,454 A * | 5/1972 | Cottrell | 180/273 |
| 3,774,711 A | 11/1973 | Lacey | |
| 3,892,294 A * | 7/1975 | Nieminski | 188/109 |
| 4,198,092 A | 4/1980 | Federspiel | |
| 4,258,896 A | 3/1981 | Kato et al. | |
| 4,278,144 A * | 7/1981 | Perin | 180/329 |
| 4,453,616 A | 6/1984 | Porter | |
| 4,538,695 A | 9/1985 | Bradt | |
| 4,582,157 A | 4/1986 | Watanabe | |
| 4,724,920 A | 2/1988 | Tsuchida et al. | |
| 4,765,432 A | 8/1988 | Odom | |
| 4,843,817 A | 7/1989 | Shivvers et al. | |
| 4,874,055 A | 10/1989 | Beer | |
| 4,878,339 A | 11/1989 | Marier et al. | |
| 4,920,734 A | 5/1990 | Wenzel | |

(Continued)

OTHER PUBLICATIONS

"Wooden Ergonomic Kneeling Posture Office Chair;" by Cross Country Furniture; Amazon.com.

(Continued)

*Primary Examiner* — Paul N Dickson
*Assistant Examiner* — Nicole Verley
(74) *Attorney, Agent, or Firm* — Greenberg Traurig, LLP

(57) ABSTRACT

Embodiments of the invention provide a lawn mower including a frame, a seat or operator station, one or more handles, and a suspension unit coupled between the frame and the seat or operator station. The lawn mower can include one or more pivot members with a first portion coupled to the frame at a pivot location forward of the seat or operator station and a second portion coupled to the seat or operator station. The one or more pivot members can allow the seat or operator station and the one or more handles to move with respect to the frame while the suspension unit absorbs a portion of shock caused by riding over the uneven terrain. The seat can be positioned at least partially between a first drive wheel and a second drive wheel and at least partially along a drive axis. The seat can be declined with respect to a horizontal plane so that the operator's upper torso leans forward at an angle with respect to a vertical plane when the operator is sitting on the seat.

82 Claims, 11 Drawing Sheets

U.S. PATENT DOCUMENTS

| | | | |
|---|---|---|---|
| 4,957,302 A * | 9/1990 | Maxwell | 280/32.6 |
| 5,004,251 A | 4/1991 | Velke et al. | |
| 5,042,238 A | 8/1991 | White, IIII et al. | |
| 5,042,239 A | 8/1991 | Card | |
| 5,077,959 A | 1/1992 | Wenzel | |
| 5,127,215 A | 7/1992 | Wenzel | |
| 5,168,947 A | 12/1992 | Rodenborn | |
| 5,239,810 A | 8/1993 | Gugel | |
| 5,367,861 A | 11/1994 | Murakawa et al. | |
| 5,367,864 A | 11/1994 | Ogasawara et al. | |
| 5,488,818 A | 2/1996 | Powers et al. | |
| 5,507,138 A | 4/1996 | Wright et al. | |
| 5,529,135 A | 6/1996 | Wenzel et al. | |
| 5,600,944 A | 2/1997 | Wright et al. | |
| 5,603,281 A | 2/1997 | Harvey et al. | |
| 5,653,466 A | 8/1997 | Berrios | |
| 5,697,623 A | 12/1997 | Bermes et al. | |
| 5,701,965 A | 12/1997 | Kamen et al. | |
| 5,765,347 A | 6/1998 | Wright et al. | |
| 5,799,475 A | 9/1998 | Borling et al. | |
| 5,809,755 A | 9/1998 | Velke et al. | |
| 5,809,756 A | 9/1998 | Scag et al. | |
| 5,810,371 A | 9/1998 | Velke | |
| 5,873,224 A | 2/1999 | Murakawa et al. | |
| 5,882,020 A | 3/1999 | Velke | |
| 5,941,920 A | 8/1999 | Schubert | |
| 5,964,082 A | 10/1999 | Wright et al. | |
| 5,984,031 A | 11/1999 | Velke et al. | |
| 6,000,705 A | 12/1999 | Velke | |
| 6,039,142 A * | 3/2000 | Eckstein et al. | 180/333 |
| 6,044,634 A | 4/2000 | Velke et al. | |
| 6,059,055 A * | 5/2000 | Velke et al. | 180/19.1 |
| 6,062,582 A | 5/2000 | Martin | |
| 6,085,504 A | 7/2000 | Wright et al. | |
| 6,094,897 A | 8/2000 | Velke et al. | |
| 6,138,446 A | 10/2000 | Velke et al. | |
| 6,145,855 A | 11/2000 | Bellis, Jr. | |
| 6,152,062 A | 11/2000 | Hattori | |
| 6,155,034 A | 12/2000 | Velke et al. | |
| 6,164,673 A | 12/2000 | Matsuura | |
| 6,182,429 B1 | 2/2001 | Velke et al. | |
| 6,189,304 B1 | 2/2001 | Velke et al. | |
| 6,189,305 B1 | 2/2001 | Wright et al. | |
| 6,205,753 B1 | 3/2001 | Velke et al. | |
| 6,234,495 B1 | 5/2001 | Velke | |
| 6,276,486 B1 | 8/2001 | Velke et al. | |
| 6,301,865 B1 | 10/2001 | Velke et al. | |
| 6,327,839 B1 | 12/2001 | Velke et al. | |
| 6,390,225 B2 | 5/2002 | Velke et al. | |
| 6,405,515 B1 | 6/2002 | Wright et al. | |
| 6,415,587 B1 | 7/2002 | Velke et al. | |
| 6,434,917 B1 * | 8/2002 | Bartel | 56/11.3 |
| 6,438,930 B1 | 8/2002 | Velke et al. | |
| 6,440,046 B1 * | 8/2002 | Tholkes | 482/142 |
| 6,442,917 B1 | 9/2002 | Velke et al. | |
| 6,446,744 B2 | 9/2002 | Wubbolts et al. | |
| 6,488,291 B1 | 12/2002 | Bellis, Jr. | |
| 6,497,422 B1 | 12/2002 | Bellis, Jr. | |
| 6,499,282 B1 | 12/2002 | Velke et al. | |
| 6,516,596 B2 * | 2/2003 | Velke et al. | 56/14.7 |
| 6,550,563 B2 | 4/2003 | Velke et al. | |
| 6,560,952 B2 | 5/2003 | Velke et al. | |
| 6,588,787 B2 * | 7/2003 | Ou | 280/287 |
| 6,625,965 B2 | 9/2003 | Wright et al. | |
| 6,640,526 B2 | 11/2003 | Velke et al. | |
| 6,658,831 B2 | 12/2003 | Velke et al. | |
| 6,688,089 B2 | 2/2004 | Velke et al. | |
| 6,688,090 B2 | 2/2004 | Velke et al. | |
| 6,845,829 B2 * | 1/2005 | Hafendorfer | 180/6.48 |
| 6,862,872 B2 | 3/2005 | Wright et al. | |
| 6,880,475 B1 | 4/2005 | Thompson | |
| 6,912,831 B2 | 7/2005 | Velke et al. | |
| 6,935,092 B2 | 8/2005 | Velke et al. | |
| 6,935,093 B2 | 8/2005 | Velke et al. | |
| 7,172,047 B2 * | 2/2007 | Kidokoro | 180/273 |
| 7,272,920 B2 | 9/2007 | Wright et al. | |
| 7,299,610 B2 * | 11/2007 | Piontek | 56/11.3 |
| 7,318,311 B2 | 1/2008 | Wright et al. | |
| 7,325,388 B2 | 2/2008 | Wright et al. | |
| 7,364,169 B2 | 4/2008 | Velke et al. | |
| 7,428,884 B2 | 9/2008 | Velke et al. | |
| 7,614,639 B2 * | 11/2009 | Tholkes et al. | 280/638 |
| 2002/0014357 A1 * | 2/2002 | Hammonds | 180/6.2 |
| 2002/0060101 A1 * | 5/2002 | Carleton | 180/89.12 |
| 2004/0035625 A1 | 2/2004 | Talbot et al. | |
| 2004/0200202 A1 | 10/2004 | Wright et al. | |
| 2004/0206568 A1 | 10/2004 | Davis et al. | |
| 2005/0126146 A1 | 6/2005 | Velke et al. | |
| 2006/0086552 A1 | 4/2006 | Vaisanen | |
| 2006/0144634 A1 * | 7/2006 | Portscheller et al. | 180/330 |
| 2006/0266573 A1 * | 11/2006 | Ishii et al. | 180/326 |
| 2007/0034435 A1 | 2/2007 | Berg et al. | |
| 2007/0039301 A1 | 2/2007 | Velke et al. | |
| 2007/0039302 A1 | 2/2007 | Velke et al. | |
| 2007/0074922 A1 * | 4/2007 | Coombs et al. | 180/315 |
| 2007/0095040 A1 | 5/2007 | Berkeley | |
| 2008/0251309 A1 * | 10/2008 | Lippert et al. | 180/212 |
| 2009/0308039 A1 | 12/2009 | Marshall et al. | |

OTHER PUBLICATIONS

Briggs & Stratton Yard Power Products; "Ferris Operator's Manual ProCut S Series;" Revision 00, Rev. Date: Oct. 2006; Munnsville, Ny 13409 USA.

Wright Manufacturing, Inc.; "Wright Sentar Parts List for Sentar," Updated Nov. 2006; Wright Commercial Products, 4600X Wedgewood Blvd., Frederick, MD 21703.

* cited by examiner

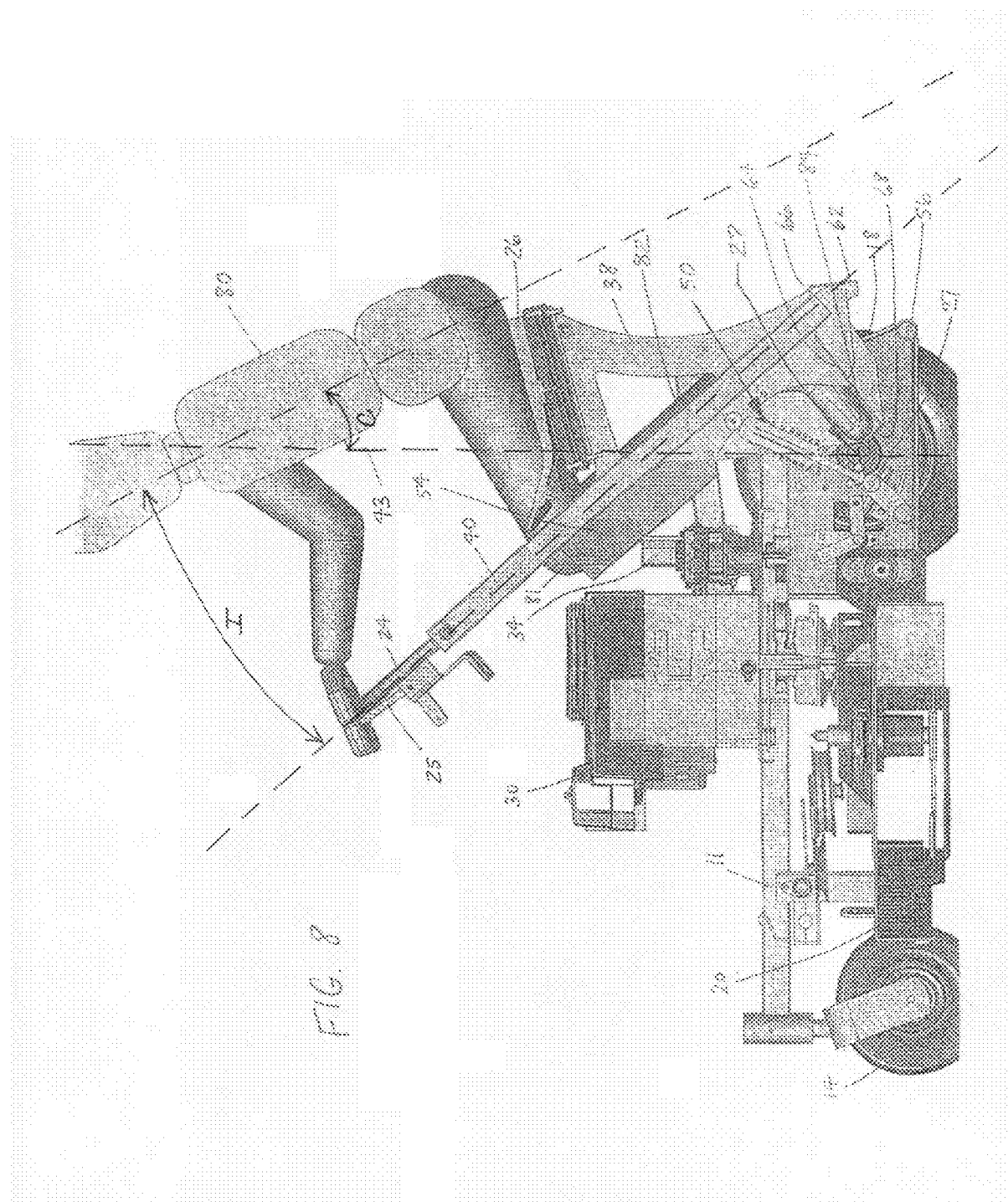

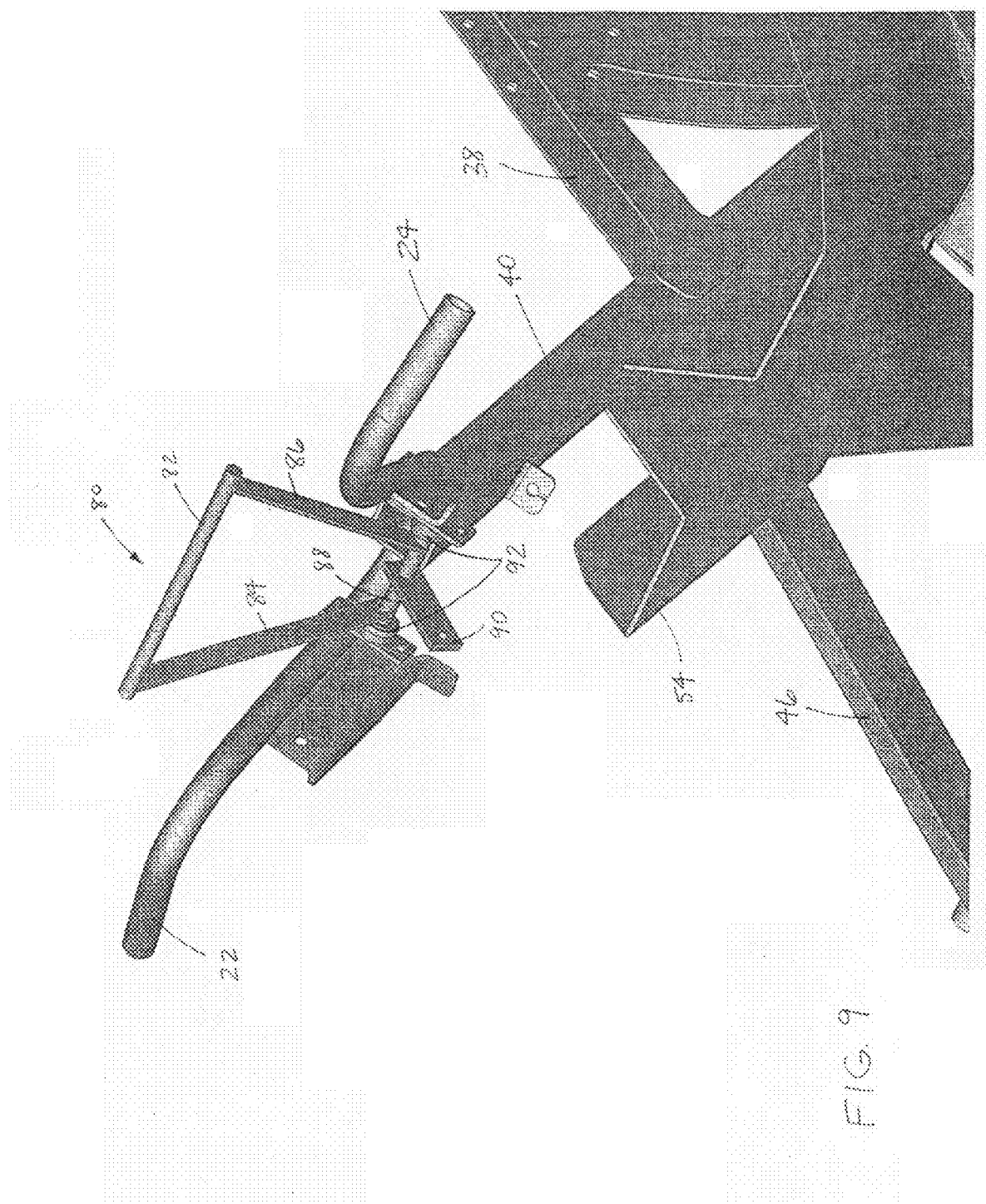

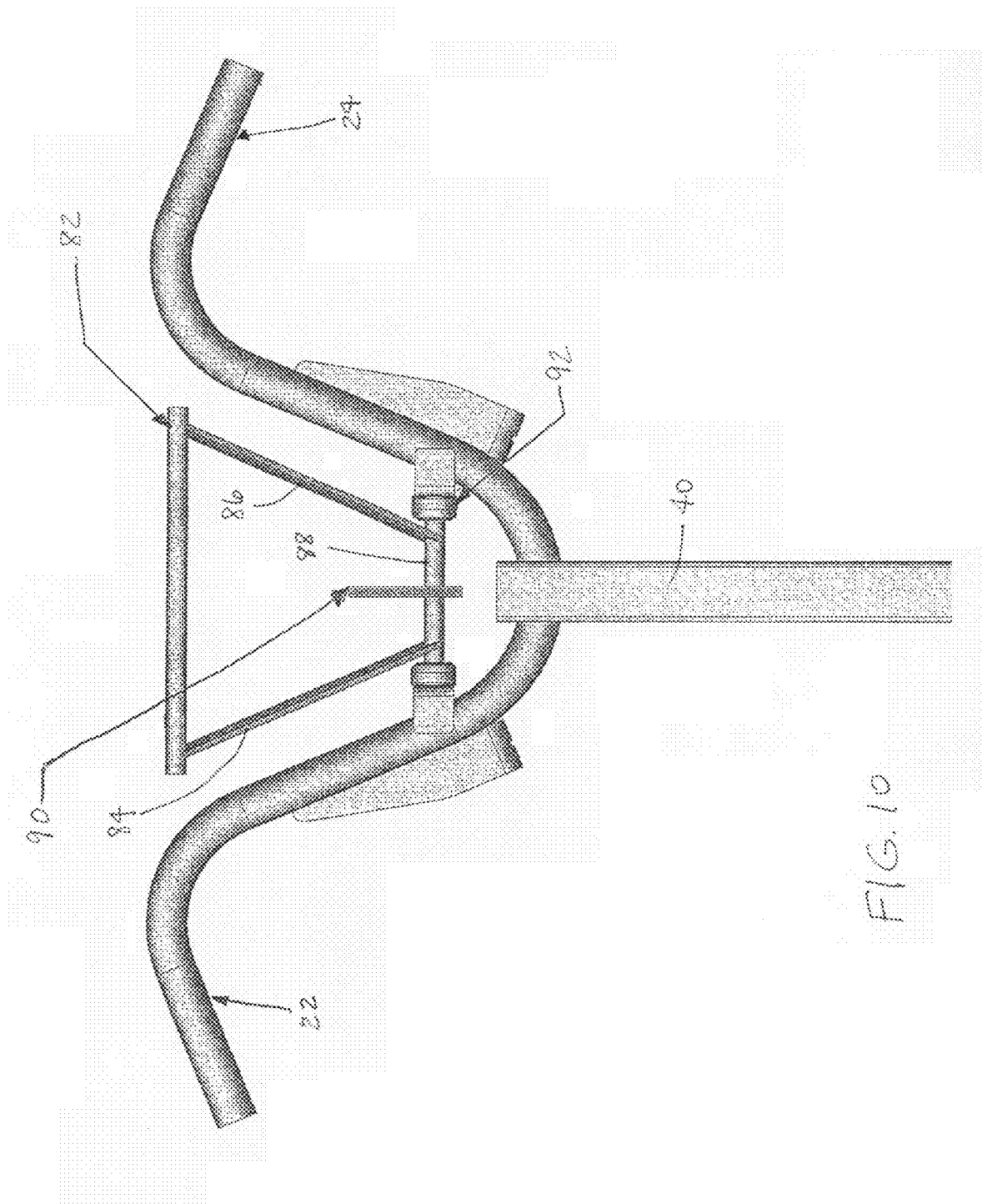

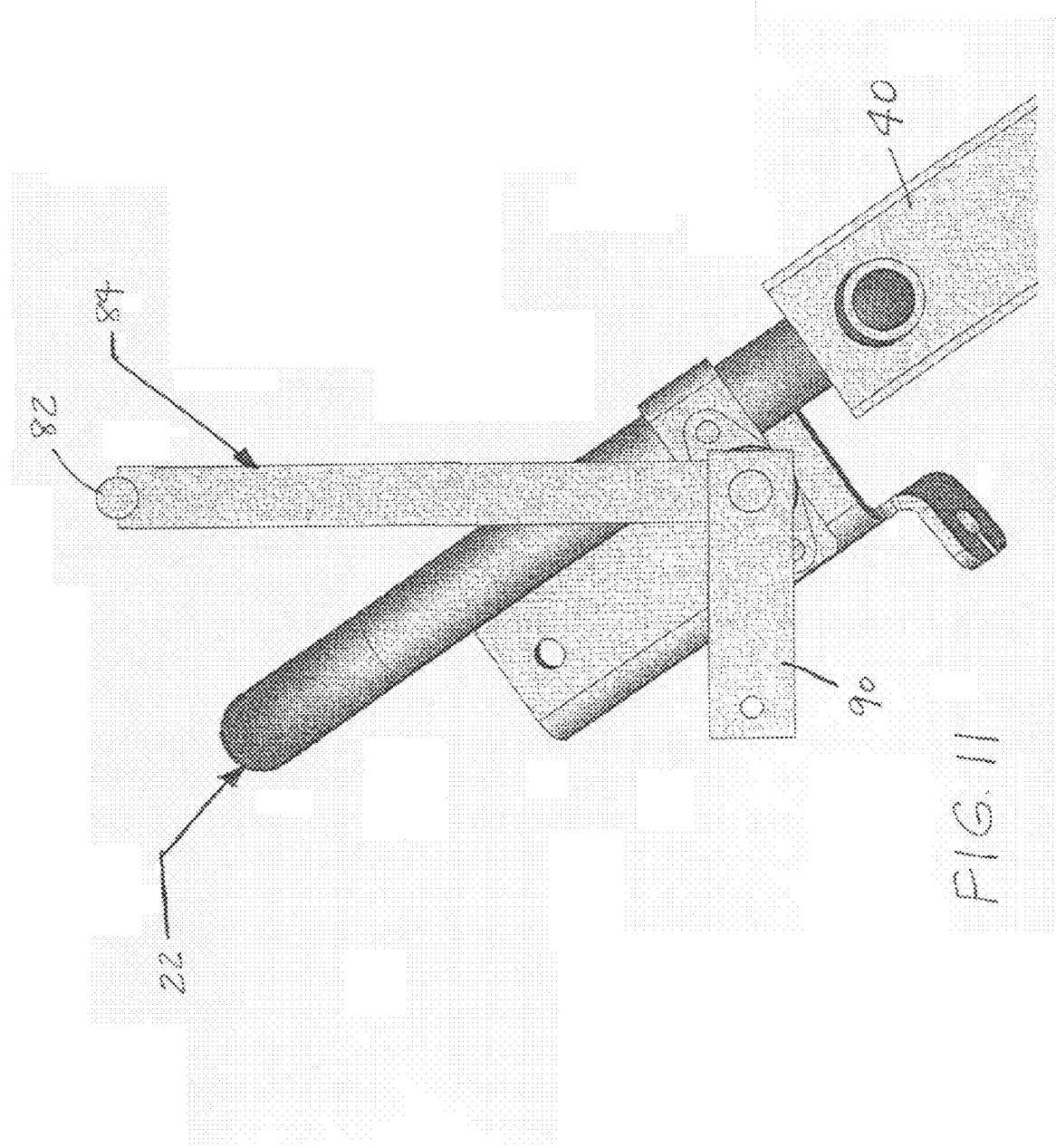

LAWN MOWER WITH SUSPENDED ERGONOMIC SEAT

BACKGROUND

There has been a trend in the power lawn mower field of making riding lawn mowers more compact and more maneuverable. However, this is often achieved at the expense of operator comfort.

For example, standing mowers are becoming increasingly popular. In this type of mower, a small platform is usually provided at the rear of the mower, upon which the operator stands while operating the mower. One typically cannot operate a standing mower for extended periods of time, because the constant standing can become very tiresome on the operator's legs. Moreover, the standing platforms of such mowers typically do not have any means of absorbing the shock caused by the terrain. Thus, the shock caused by any uneven terrain is borne by the operator himself, primarily in the operator's legs and back. This can lead to rapid fatigue in the operator. In some cases, standing mowers are simply not an option for individuals with back and leg-joint problems.

In addition to shock being transferred to the operator via a foot platform, shock may also be transferred from the mower control, such as a steering wheel or a handlebar. Such mower controls also do not have any means for absorbing the shock caused by uneven terrain. Instead, the shock is borne by the operator's arms, which leads to further fatigue of the operator.

Operator fatigue can also be an issue in seated mowers. For example, while a typical seated mower, in which the seat is located over the cutting deck, may have a spring-supported seat, neither the foot platform nor the mower control provide any relief from the vibrations caused by the terrain or the engine. Moreover, the space occupied by the operator's legs is typically wide open, such that the operator's legs tend to bounce from side to side, particularly when traveling over rough terrain or on a side-hill incline.

SUMMARY

Some embodiments of the invention provide a lawn mower including a frame, a seat or operator station that supports at least a portion of the operator's body weight, one or more handles coupled to the seat or operator station, and a suspension unit coupled between the frame and the seat or operator station. The lawn mower can also include one or more pivot members with a first portion coupled to the frame at a pivot location forward of the seat or operator station and a second portion coupled to the seat or operator station. The one or more pivot members can allow the seat or operator station and the one or more handles to move with respect to the frame while the suspension unit absorbs a portion of shock caused by riding over the uneven terrain.

In some embodiments of the invention, the lawn mower can include a frame located within a substantially horizontal plane and a first drive wheel and a second drive wheel positioned along a drive axis that is located within a substantially vertical plane. The lawn mower can include a seat positioned at least partially between the first drive wheel and the second drive wheel and at least partially along the drive axis. The seat can include a rear portion positioned higher than a front portion in order to be declined with respect to the horizontal plane so that the operator's upper torso leans forward at an angle with respect to the vertical plane when the operator is sitting on the seat. In some embodiments, the lawn mower can also include one or more leg supports that are angled with respect to the horizontal plane so that a portion of the operator's body weight is supported by the one or more leg supports when the operator is sitting on the seat and when the operator's legs contact the one or more leg supports. In some embodiments, the first drive wheel and the second drive wheel are independently controlled to provide a substantially zero-turn radius for the lawn mower.

BRIEF DESCRIPTION OF THE DRAWINGS

FIG. 8 is another side view of the mower of FIG. 1 taken along line 8-8 of FIG. 4 with an operator in position to operate the mower.

FIG. 9 is a perspective view of a speed control lever and handle controls according to one embodiment of the invention.

FIG. 10 is a front view of the speed control lever and handle controls of FIG. 9.

FIG. 11 a side view of the speed control lever and handle controls of FIG. 9.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
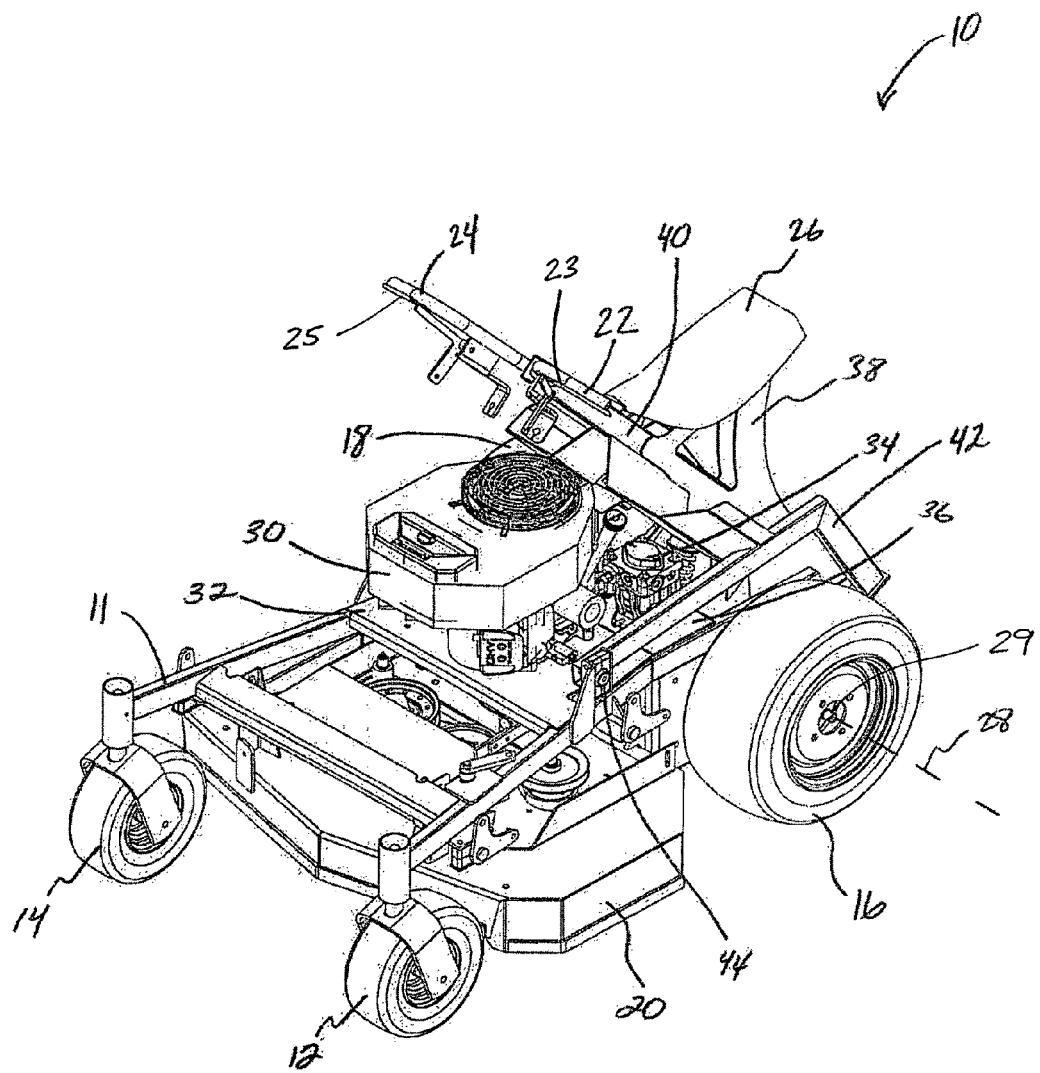
FIG. 1 is a front perspective view of a mower according to one embodiment of the invention.

FIGS. 1-8 illustrate a mower 10 according to one embodiment of the invention. As shown in FIG. 1, the mower 10 includes a frame 11, a left front wheel 12, a right front wheel 14, a left rear drive wheel 16, and a right rear drive wheel 18. The mower 10 includes a cutting deck 20 which can be positioned behind the front wheels 12, 14 and in front of the rear drive wheels 16, 18. The mower 10 can include a left handle bar 22 and a right handle bar 24. The mower 10 can include a left handle control 23 and a right handle control 25 for controlling the left/right direction, the forward/reverse direction, and/or the braking of the rear drive wheels 16, 18. The left handle control 23 can move independently of the right handle control 25. In some embodiments, the left and right handle controls 23, 25 can be moved between forward, neutral, and reverse positions to control the state of the mower's transmission.

Figure 5:
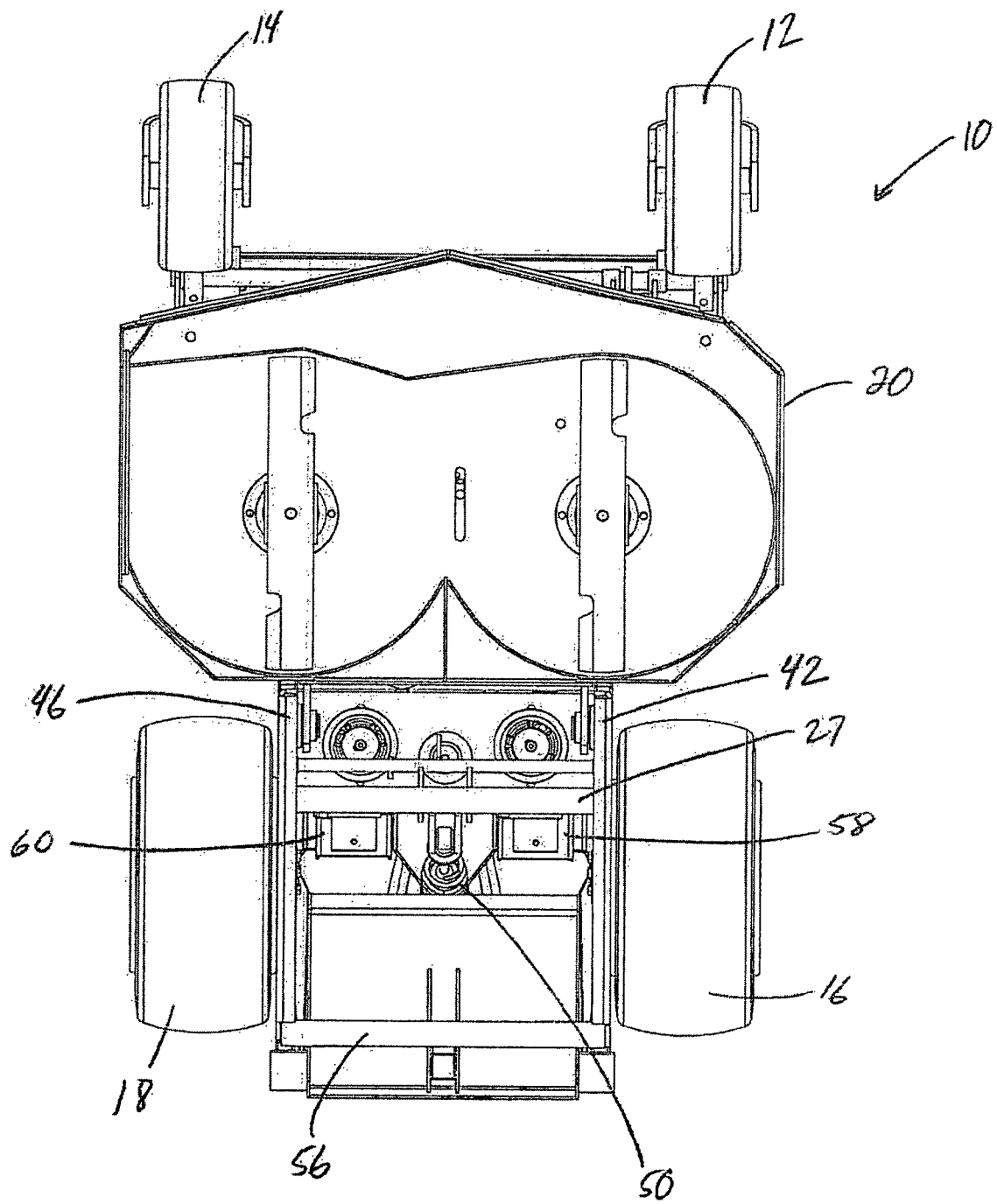
FIG. 5 is a bottom view of the mower of FIG. 1.
Figure 7:
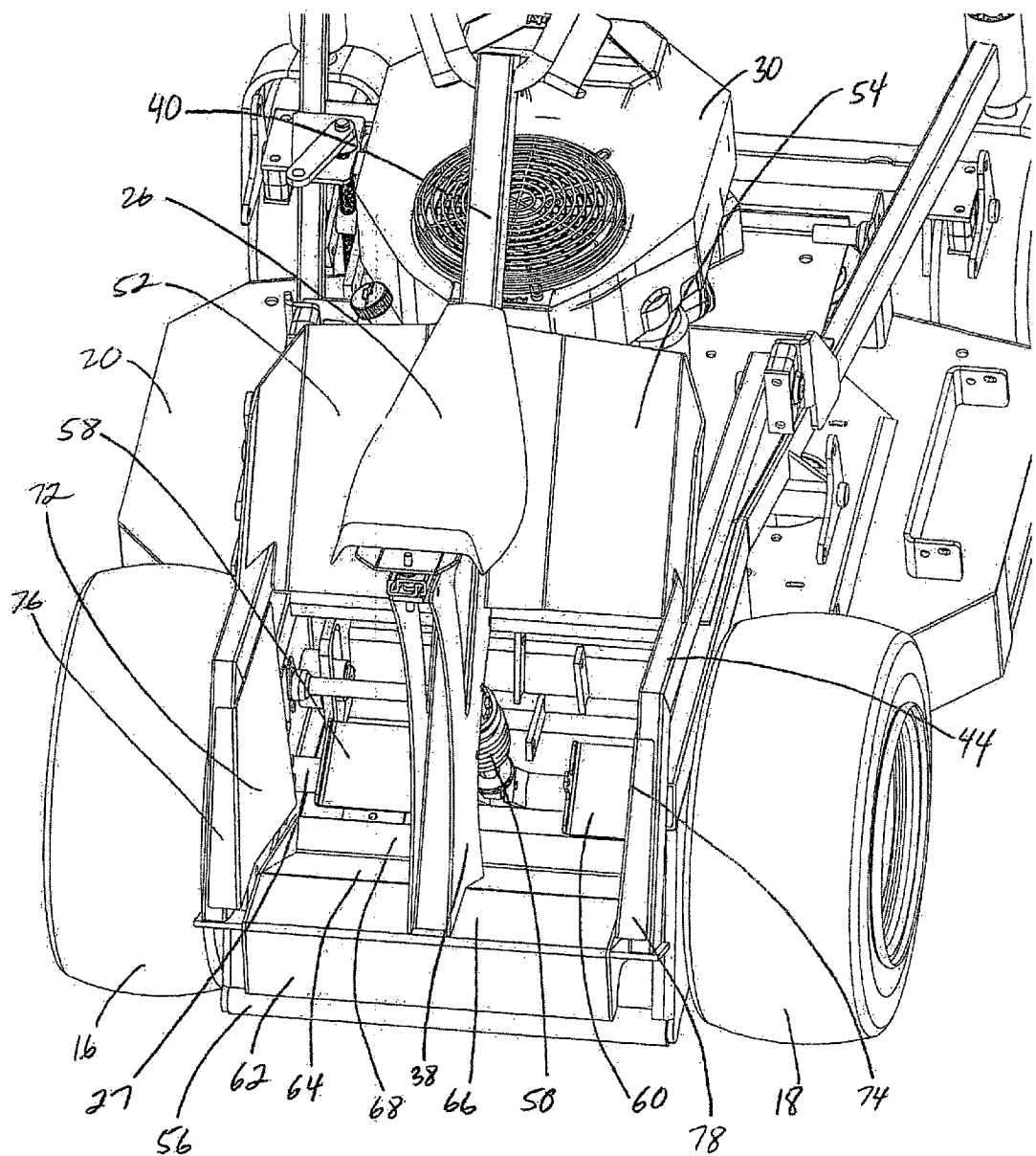
FIG. 7 is another rear perspective view of the mower of FIG. 1.

As also shown in FIG. 1, the mower 10 includes an engine 30 which can be mounted to an engine deck 32 or otherwise suitably mounted to the frame 11. The mower 10 also includes a suitable transmission, such as two hydrostatic pumps 34 which can be mounted to a pump deck 36. In one embodiment, the pump deck 36 is a separate deck from the engine deck 32. In some embodiments, the hydrostatic pumps 34 can independently control the speed and direction of the rear drive wheels 16, 18. For example, each hydrostatic pump 34 can include its own drive axle corresponding to one of the rear drive wheels 16, 18. As a result, in some embodiments, the mower 10 does not include a common drive axle that spans the width of the mower 10 between the rear drive wheels 16, 18. However, the mower 10 can include a pump axle 27 (as shown in FIGS. 5, 7, and 8) coupled indirectly through linkages to the hydrostatic pumps 34. As described below, the pump axle 27 can be rotated by the operator's feet, for example to control the speed of the mower 10 and/or to return the transmission to neutral, in some embodiments. As further shown in FIG. 1, a rear axis 28 can be drawn between hubs 29 of the rear drive wheels 16, 18.

In some embodiments of the invention, as shown in FIG. 1, the mower 10 includes a seat 26. The seat 26 can be backless (similar to a bike or recreational vehicle seat) or the seat 26 can include a back portion. The seat 26 can be supported by one or more seat support beams 38. The seat support beams 38 can be coupled to a handle support beam 40. The handle support beam 40 can support each of the left and right handle bars 22, 24. FIG. 1 also illustrates a left pivot member 42 and a left pivot location 44 coupled to the seat 26 as described below.

Figure 2:
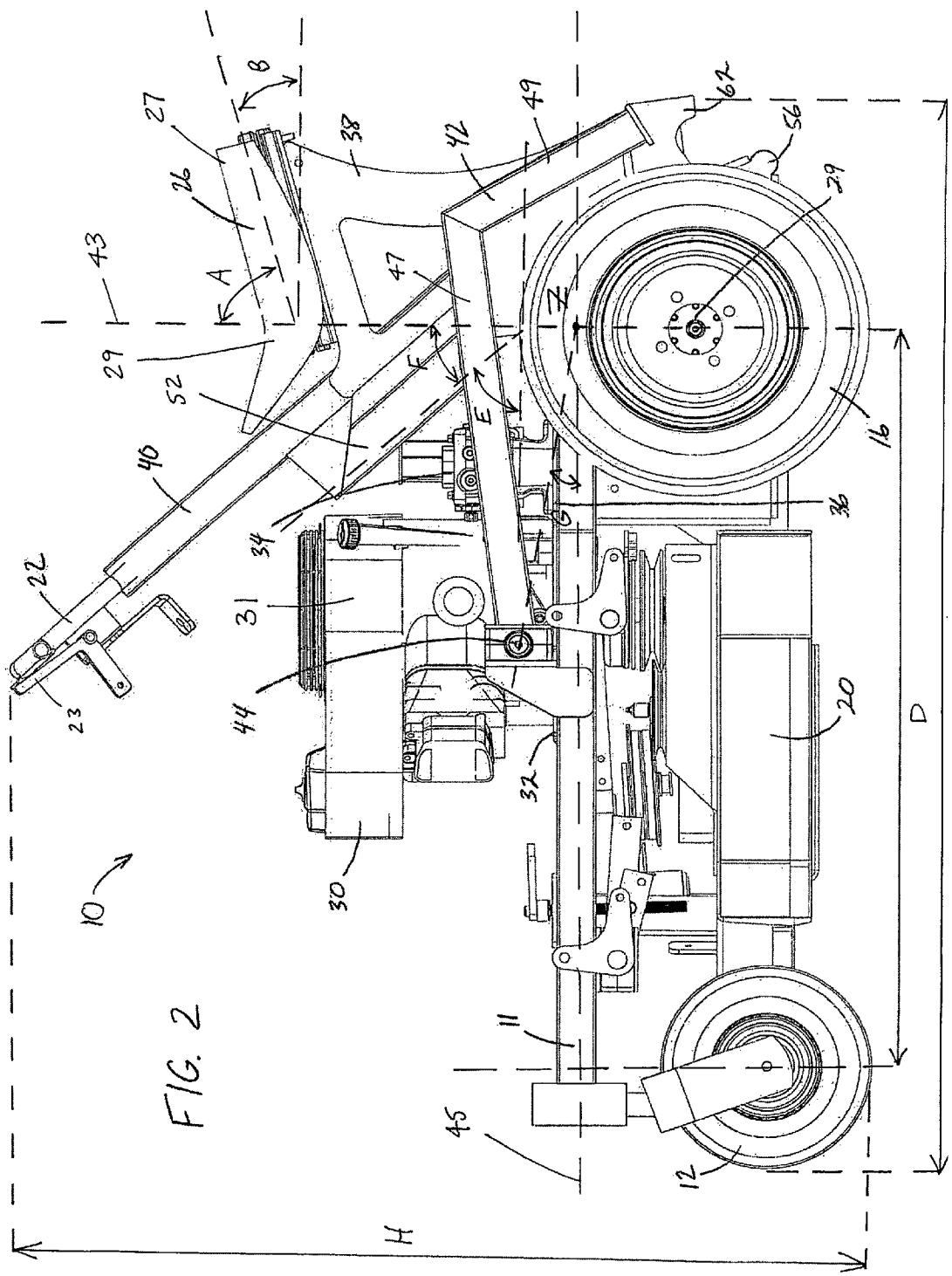
FIG. 2 is a side view of the mower of FIG. 1.

FIG. 2 is a side view of the mower 10 of FIG. 1. FIG. 2 illustrates a substantially vertical plane 43 which can be defined to include the drive axis 28 (as shown in FIG. 1) of the rear drive wheels 16, 18. FIG. 2 also illustrates a substantially horizontal plane 45 within which at least a portion of the frame 11 can be located. In some embodiments, at least a portion of the seat 26 can be positioned at an angle A with respect to the vertical plane 43 and at an angle B with respect to a horizontal plane that is substantially parallel with the horizontal plane 45 within which the frame 11 is located. In some embodiments, the angle A can be within a range of about 45 to 85 degrees. In one embodiment, the angle A can be within a range of about 70 to 75 degrees. In some embodiments, the complimentary angle B can be within a range of about 5 to 45 degrees. In one embodiment, the angle B can be within a range of about 15 to 20 degrees. In this manner, the seat 26 can include a rear portion 27 that is higher than a front portion 29. As a result, as shown in FIG. 8, the operator's upper torso can lean forward at an angle C with respect to the vertical plane 43 when the operator 80 is sitting on the seat 26 and grasping the left and right handle bars 22, 24. The angle C can be the same as the angle B within a range of about 5 to 45 degrees or, in one embodiment, about 15 to 20 degrees.

FIGS. 2 and 8 further illustrates the compact and stable nature of the mower 10. The mower 10 can be compact by including left and right handle bars 22, 24 that project forward from the vertical plane 43 and project over at least a rear portion 31 of the engine 30 (or the hydrostatic pumps 34 depending on their location). The handle bars 22, 24 can be angled with respect to the vertical plane 43 so that the operator head clearance of the mower 10 is lower. The position of the handle bars 22, 24 can also result in the operator's center of gravity being approximately on the vertical plane 43 or forward from the vertical plane 43, which can substantially increase stability, especially during zero radius turns. In one embodiment, the seat 26 can be positioned behind the vertical plane 43 but the operator's center of gravity can be on or forward from the vertical plane 43. The angle of the handle bars 22, 24 can also result in the operator being able to remain seated during uphill operation of the mower 10 without the mower 10 tipping backwards while climbing the hill. Due to the position of the handle bars 22, 24, the overall height H (as shown in FIG. 2) of the mower can be about 45 inches, which is substantially lower than conventional standing mowers. This lower overall height can result in the operator not having to crouch to avoid hanging obstacles, such as tree branches. The mower 10 can also be compact by including front wheels 12, 14 that are closer to the rear drive wheels 16, 18 in the front-to-rear direction than conventional riding mowers. For example, the front-to-rear distance D (as shown in FIG. 2) between the axis of the front wheels 12, 14 and the axis the rear drive wheels 16, 18 can be about 40 inches. In addition, the overall length L (as shown in FIG. 2) of the mower 10 can be about 68 inches, which is substantially shorter than conventional riding mowers. The mower 10 can be more stable than conventional riding or standing mowers by including at least a portion of the seat 26 within the vertical plane 43 defined by the drive axis 28 so that the operator is positioned substantially within the center of gravity of the mower 10 as the mower 10 turns. In some embodiments, the mower 10 is a substantially zero-turn radius (ZTR) mower.

Figure 3:
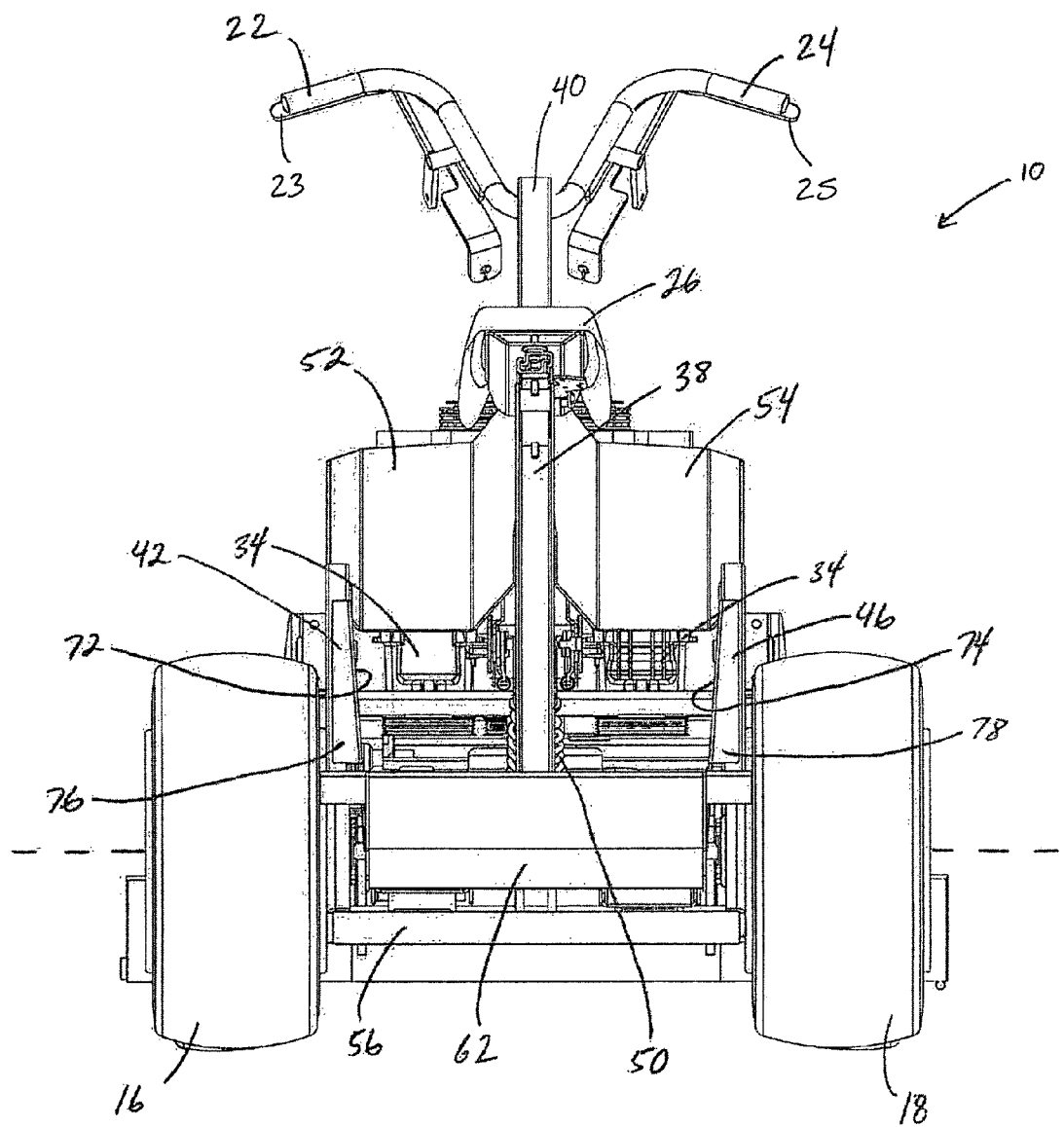
FIG. 3 is a rear view of the mower of FIG. 1.

FIG. 3 is a rear view of the mower 10 illustrating the seat support beams 38 and the handle support beam 40 being coupled to one or more suspension units 50 (such as one or more hydraulic suspension units), in some embodiments of the invention. The suspension unit 50 can also be coupled to the pump axle 27, in some embodiments, as shown and described with respect to FIG. 7.

Figure 4:
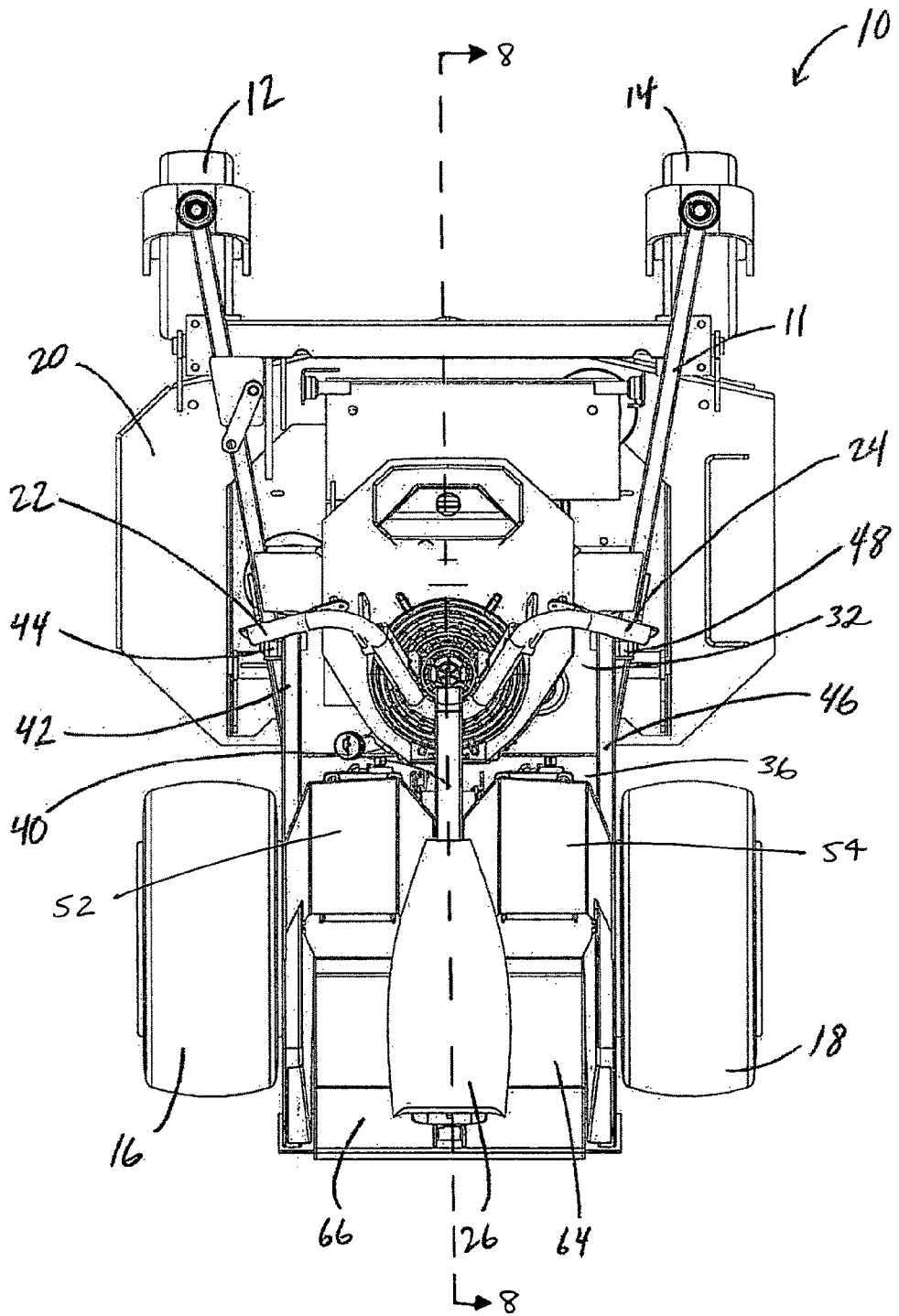
FIG. 4 is a top view of the mower of FIG. 1.
Figure 6:
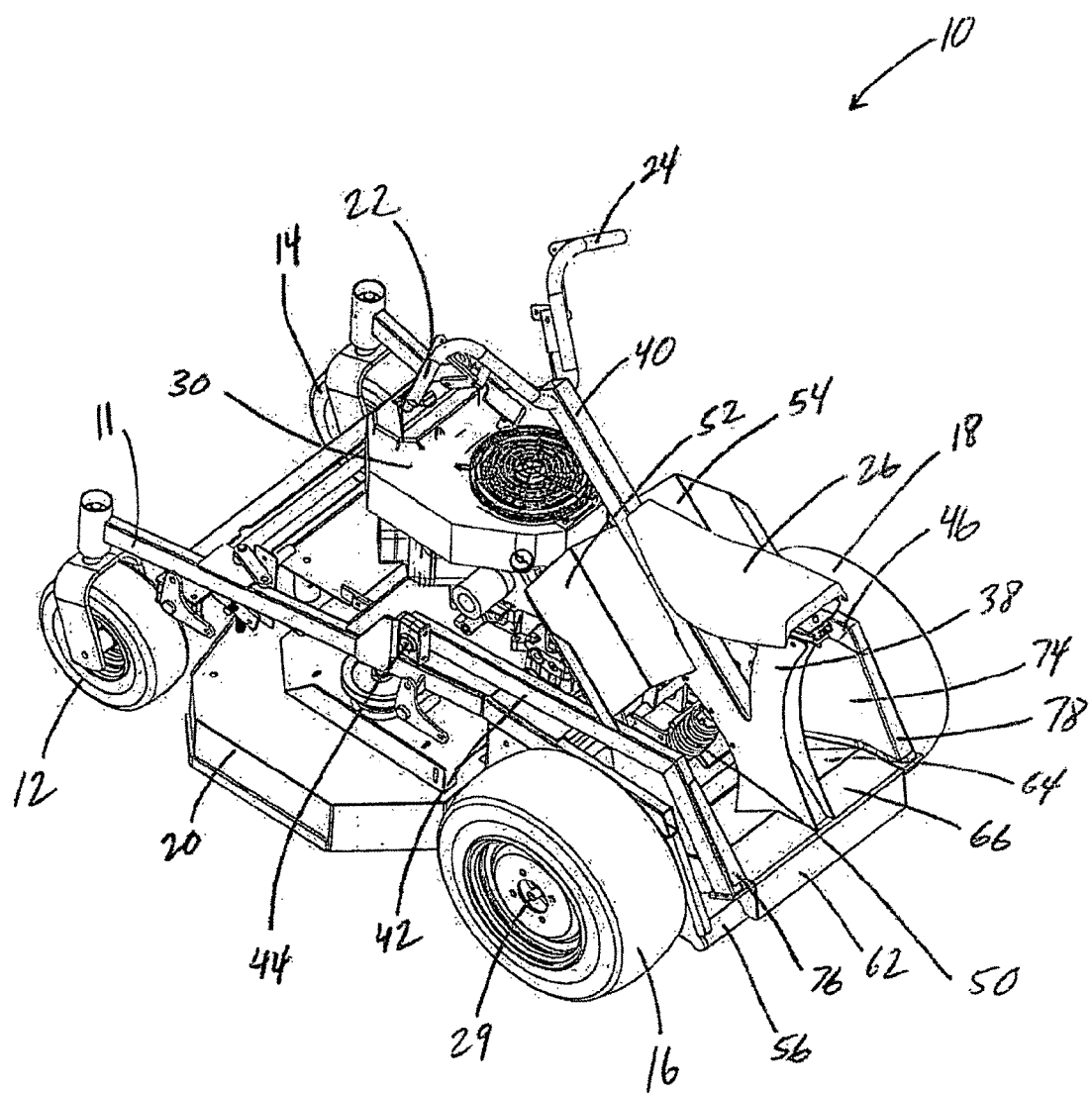
FIG. 6 is a rear perspective view of the mower of FIG. 1.

As shown in FIGS. 4 and 6, the mower 10 can include a left pivot member 42 coupled to the frame 11 at a left pivot location 44 and a right pivot member 46 coupled to the frame 11 at a right pivot location 48. In one embodiment, the left and right pivot members 42, 46 can each be shaped to extend substantially horizontally and then diagonally rearward and downward, as shown by the left pivot member 42 in FIG. 2. For example, as shown in FIG. 2, the left pivot member 42 can include a substantially horizontal portion 47 and a diagonal rearward portion 49. The substantially horizontal portion 47 of the left pivot member 42, for example, can extend to the left pivot location 44 substantially forward along the frame 11 with respect to the location of the seat 26. For example, the horizontal portion 47 can extend to a pivot location 44 that is at substantially a mid-point of the overall front-to-rear length L of the mower 11. As shown in FIG. 2, a point Z can be located at the intersection of the vertical plane 43 and the horizontal plane 45. A line drawn from the point Z to the left pivot location 44 can be positioned at an angle G with respect to the horizontal plane 45. In some embodiments, the angle G can be within a range of about positive 25 degrees to about negative 25 degrees (i.e., the left pivot location 44 can be above or below the horizontal plane 45). In one embodiment, the angle G can be about positive 6 to 7 degrees. In this manner, the pivot members 42, 46 can allow the seat 26 to move (e.g., substantially vertically) with respect to the frame 11 while the suspension unit 50 absorbs a portion of shock caused by riding over uneven terrain. In addition, the fore and aft movement of the operator can be minimized.

With the pivot members 42, 46 and the suspension unit 50, the seat 26 can be supported in a suspended position with respect to the frame 11. In some embodiments, the seat 26 can also be suspended with respect to the engine deck 32, the pump deck 36, and/or the pump axle 27 of the mower 10. As the mower 10 is driven over uneven terrain, the seat 26 can be allowed to move up and down as the pivot members 42, 46 pivot about the pivot locations 44, 48. The movement of the seat 26 can be controlled by the suspension unit 50. In some embodiments, the left and right handle controls 22, 24 can be suspended with the seat 26.

According to some embodiments of the invention, FIGS. 3, 4, 6, and 7 illustrate that the mower 10 can include one or more leg supports, such as a left knee rest 52 and a right knee rest 54. Another embodiment of a leg support can include a single support structure spanning the area in front of the operator's thighs, knees, shins, and/or ankles. Yet another embodiment of the leg support can include one or more supports that provide support to any portion of the operator's thighs, knees, shins, and/or ankles. In some embodiments, the left and right knee rests 52, 54 can be coupled to the seat support beam 38 and/or the handle support beam 40. When the operator sits on the seat 26, he can rest his knees on the knee rests 52, 54. The knee rests 52, 54 can be positioned at an angle with respect to the vertical plane 43 and at an angle with respect to the horizontal plane 45. As shown in FIG. 2, the left knee rest 52, for example, can be positioned at an angle E with respect to a horizontal plane parallel to the horizontal plane 45 (within which the frame 11 is located) and at an angle F with respect to the vertical plane 43. In some embodiments, the angle E can be about 43 to 47 degrees and the complimentary angle F can also be about 43 to 47 degrees.

At least a portion of the operator's body weight can be supported by the knee rests 52, 54 when the operator is sitting on the seat 26 and when the operator's knees contact the knee rests 52, 54. In some embodiments, the seat 26 is positioned with respect to the knee rests 52, 54 so that when the operator is sitting on the seat 26 and the operator's knees are contacting the knee rests 52, 54, an angle between the operator's thighs and the operator's back is about 90 degrees. In some embodiments, the seat 26 can be adjustable up and down the handle support beam 40 in order to accommodate shorter and taller operators. In one embodiment, the handle support beam 40 can include fixed holes that allow the seat 26 to be adjusted. In some embodiments, the seat 26 is positioned with respect to the knee rests 52, 54 so that when the operator is sitting on the seat 26 and the operator's knees are contacting the knee rests 52, 54, a substantial portion of the operator's body weight is distributed between the operator's pelvis and the operator's knees. In some embodiments, the seat 26 is positioned with respect to the knee rests 52, 54 so that when the operator is sitting on the seat 26 and the operator's knees are contacting the knee rest 52, 54, the operator's back, shoulders, and neck are substantially aligned. In some embodiments, the knee rests 52, 54 are suspended with the seat 26 by the suspension unit 50. In some embodiments, the knee rests 52, 54 are suspended with the seat 26 and the handle bars 22, 24.

In one embodiment of the invention, as shown in FIG. 7, a left foot pedal 58 and a right foot pedal 60 can be coupled to the pump axle 27 in order to rotate the pump axle 27. When the operator sits on the seat 26, he can reach the foot pedals 58, 60. In some embodiments, the seat 26 is suspended with respect to the frame 11 but the foot pedals 58, 60 are not suspended with respect to the frame 11. In one embodiment, one of the foot pedals 58, 60 can rotate the pump axle 27 to control the speed of the mower 10, while the other one of the foot pedals 58, 60 can rotate the pump axle 27 to return the mower 10 to neutral. In another embodiment, the pump axle 27 can include only one foot pedal 60 that can control return of the transmission to neutral.

As shown in FIG. 6, in some embodiments, a rear portion of the frame 11 can include a stop bar 56 positioned slightly behind the rear drive wheels 16, 18. A portion of the mower 10 coupled to the seat 26 can include a stop member 62 that engages the stop bar 56 to prevent movement of the seat 26 beyond a lowermost position (as generally defined by the height of the seat support beams 38). In some embodiments, the stop bar 56 can also prevent the mower 10 from tipping over completely backwards about the rear drive axis 28.

As shown in FIG. 7, in one embodiment, the seat support beams 38 can be coupled to a first seat support plate 64, a second seat support plate 66, and a third plate 68 each positioned substantially horizontally between the rear drive wheels 16, 18. The first seat support plate 64 can be angled to be at a lower elevation toward the front of the mower 10 and at a higher elevation toward the back of the mower 10. The second seat support plate 66 can be coupled to the rear edge of the first seat support plate 64 at the higher elevation. The third plate 68 can be coupled to the forward edge of the first seat support plate 64 at the lower elevation. Triangular side walls 70 can be connected to the lateral edges of the first seat support plate 64 and the third plate 68. In this manner, the first seat support plate 64, the second seat support plate 66, the third plate 68, and the triangular side walls 70 can provide a foot rest area for the operator's feet to rest when the operator's feet are not engaging the foot pedals 58, 60.

As also shown in FIG. 7, some embodiments of the mower 10 can include a left protection plate 72 and a right protection plate 74. The left protection plate 72 can be coupled to the left pivot member 42, and the right protection plate 74 can be coupled to the right pivot member 46. As shown in FIGS. 3 and 7, the protection plates 72, 74 can each extend downwardly from the pivot members 42, 46 and inwardly from the pivot bars 42, 46, so that the protection plates 72, 74 are closer to the rear drive wheels 16, 18 at the top and further from the rear drive wheels 16, 18 at the bottom. The protection plates 72, 74 can also include flanges 76, 78 coupled to the rear edges of the pivot members 42, 46. As further shown in FIG. 7, in one embodiment, the protection plates 72, 74 are not coupled to the second seat support plate 66 or the triangular side walls 70.

FIG. 8 illustrates an operator 80 sitting on the seat 26 in position to operate the mower 10 according to one embodiment of the invention. The operator 80 shown in FIG. 8 represents an adult male in the $95^{th}$ percentile for height (i.e., a tall adult male). The operator's knee 81 and calf 82 are positioned against the right knee rest 54. The sole of the operator's foot 84 is positioned on the first seat support plate 64, while the toe of the operator's foot 84 is positioned against the third plate 68. The operator can move his right foot from this position to a position on the right foot pedal 60 (not shown in FIG. 8) in order to rotate the pump axle 27. As also shown in FIG. 8, the vertical plane 43 extends upward from and perpendicular to the rear drive axis 28. As further shown in FIG. 8, most of the operator's body, in one embodiment, including his entire back and thighs, can be positioned rearward of the vertical plane 43. In one embodiment, an angle I between the operator's back and the handle support beam 40 can be about 15 degrees. In one embodiment, the angle C between the operator's back and the vertical plane 43 can be about 28 degrees. The size of the operator will affect the position of the operator's body with respect to the vertical plane 43. The human characteristics that will affect the position of the operator's body include eight, arm length, and knee-to-hip length.

In some embodiments, an operator presence sensor can be coupled to the seat 26. The operator presence sensor can be in electrical communication with a safety interlock circuit that shuts down the engine 30 if the operator is not sitting on the seat 26 in certain circumstances. In one embodiment, before starting the engine 30, the operator must be sitting on the seat 26. Also, after the engine 30 is running, if the operator tries to stand up or get off the mower 10, the engine 30 can automatically shut down, unless the hydrostatic pumps 34 are both in neutral, the parking brake is on, and the cutting blades are off. In addition, when the engine 30 is running and the hydrostatic pumps 34 are in forward or reverse, if the operator falls off the seat 26 or tries to stand up to operate the mower 10, the engine 30 will automatically shut down. Finally, the operator cannot attempt to rest one knee on the seat 26 with one foot on the first or second seat support plates 64, 66 to operate the mower 10. If the operator attempts this, he will not be able to reach the foot pedals 58, 60 in order to control the speed of the mower 10 and to return the hydrostatic pumps 34 to neutral. In this manner, the mower 10 cannot operate if the operator is not sitting on the seat 26, according to some embodiments of the invention.

FIGS. 9-11 illustrate a speed control lever 80 according to another embodiment of the invention. The speed control lever 80 can include a handle 82 supported by two angled bars 84, 86. The angled bars 84, 86 can be coupled to a pivoting bar 88. A speed cable mount 90 can be coupled to the pivoting bar 88. A speed cable (not shown) can be coupled between the speed cable mount 90 and the hydrostatic pumps 34 in order to control the speed of the mower 10. The pivoting bar 88 can be coupled to the handle support beam 40 with bearings 92 (such as plastic ½ inch bearings). In some embodiments, the handle controls 23, 25 can also be used as a brake by returning the hydrostatic pumps 34 to neutral to effectively brake the mower 10.

Various features and advantages of the invention are set forth in the following claims.

The invention claimed is:

1. A lawn mower for use by an operator having a body weight and for riding over uneven terrain, the lawn mower comprising:
   a frame;
   a seat that supports at least a portion of the operator's body weight;
   at least one handle coupled to the seat;
   a suspension unit coupled between the frame and the seat; and
   at least one pivot member having a first portion and a second portion, the first portion coupled to the frame at a pivot location forward of the seat, the second portion coupled to the seat,
   the at least one pivot member allowing the seat and the at least one handle to move with respect to the frame while the suspension unit absorbs a portion of shock caused by riding over the uneven terrain.

2. The lawn mower of claim 1 wherein the at least one handle and the seat are suspended with respect to the frame by the suspension unit.

3. The lawn mower of claim 1 and further comprising drive wheels, and wherein the at least one handle controls at least one of direction, speed, and braking of the drive wheels.

4. The lawn mower of claim 1 and further comprising a transmission, and wherein at least one trigger is moved to control a state of the transmission.

5. The lawn mower of claim 4 wherein the transmission includes at least one hydrostatic pump.

6. The lawn mower of claim 4 and further comprising at least one foot pedal and an axle rotatably coupled to the at least one foot pedal.

7. The lawn mower of claim 6 wherein the axle is rotatable by the at least one foot pedal to at least one of control a speed of the drive wheels and to return the transmission to neutral.

8. The lawn mower of claim 1 and further comprising a cutting deck, an engine deck, and a transmission deck each independently coupled to the frame.

9. The lawn mower of claim 1 and further comprising at least one seat support beam coupled to the seat and the at least one pivot member.

10. The lawn mower of claim 9 and further comprising at least one handle support beam coupled to the at least one seat support beam.

11. The lawn mower of claim 10 wherein the at least one seat support beam and the at least one handle support beam are coupled to the suspension unit.

12. The lawn mower of claim 9 and further comprising at least one seat support plate coupled to the seat support beam.

13. The lawn mower of claim 12 wherein the at least one seat support plate includes a first angled plate and a second angled plate upon which the operator's feet rest when the operator is sitting on the seat.

14. The lawn mower of claim 1 wherein the at least one pivot member includes at least one pivot bar shaped to extend substantially horizontally and then diagonally rearward and downward.

15. The lawn mower of claim 1 and further comprising at least one leg support.

16. The lawn mower of claim 15 wherein the at least one leg support is coupled to the seat, the at least one leg support and the seat being suspended with respect to the frame by the suspension unit.

17. The lawn mower of claim 1 and further comprising a stop bar coupled to the frame and a stop member coupled to the seat, the stop bar engaging the stop member to prevent movement of the seat beyond a lowermost position.

18. The lawn mower of claim 17 wherein the stop bar substantially prevents the lawn mower from tipping over backwards.

19. The lawn mower of claim 1 and further comprising at least one foot and leg protection plate coupled to the at least one pivot member.

20. The lawn mower of claim 1 and further comprising an operator presence sensor coupled to the seat.

21. The lawn mower of claim 20 and further comprising a safety interlock circuit in electrical communication with the operator presence sensor, the safety interlock circuit shutting down an engine of the lawn mower if the operator is not contacting the seat.

22. A lawn mower for use by an operator having a body weight, the lawn mower comprising:
   a frame located within a substantially horizontal plane;
   a first drive wheel and a second drive wheel positioned along a drive axis, the drive axis located within a substantially vertical plane;
   a seat positioned at least partially between the first drive wheel and the second drive wheel and at least partially along the drive axis, the seat being angled with respect to the horizontal plane so that the operator's upper torso leans forward at an angle with respect to the vertical plane when the operator is sitting on the seat; and
   at least one leg support that is angled with respect to the horizontal plane so that a portion of the operator's body weight is supported by the at least one leg support when the operator is sitting on the seat and when the operator's legs contact the at least one leg support.

23. The lawn mower of claim 22 and further comprising a suspension unit, and wherein the seat and the at least one leg support are suspended with respect to the frame.

24. The lawn mower of claim 23 wherein the seat is suspended with respect to the frame so that motion of the operator with respect to the frame when sitting on the seat is substantially vertical.

25. The lawn mower of claim 23 and further comprising at least one handle coupled to the seat and suspended with respect to the frame.

26. The lawn mower of claim 23 and further comprising at least one foot rest coupled to the seat and suspended with respect to the frame.

27. The lawn mower of claim 22 wherein the seat is positioned with respect to the at least one leg support so that when the operator is sitting on the seat and the operator's legs are contacting the at least one leg support an angle between the operator's thighs and the operator's back is about 90 degrees.

28. The lawn mower of claim 22 wherein the seat is positioned with respect to the at least one leg support so that when the operator is sitting on the seat and the operator's legs are contacting the at least one leg support a substantial portion of the operator's body weight is distributed between the operator's pelvis and the operator's knees or shins.

29. The lawn mower of claim 22 wherein the seat is positioned with respect to the at least one leg support so that when the operator is sitting on the seat and the operator's legs are contacting the at least one leg support, the operator's back, shoulders, and neck are substantially aligned.

30. The lawn mower of claim 22 and further comprising a cutting deck, and wherein the operator mounts the seat from behind the cutting deck and from substantially behind the first drive wheel and the second drive wheel.

31. A lawn mower for use by an operator having a body weight and for riding over uneven terrain, the lawn mower comprising:
   a frame;
   an operator station that supports at least a portion of the operator's body weight;
   at least one handle coupled to the operator station;
   a suspension unit coupled between the frame and the operator station; and
   at least one pivot member having a first portion and a second portion, the first portion coupled to the frame at a pivot location forward of the operator station, the second portion coupled to the operator station,
   the at least one pivot member allowing the operator station and the at least one handle to move with respect to the frame while the suspension unit absorbs a portion of shock caused by riding over the uneven terrain.

32. The lawn mower of claim 31 wherein the at least one handle and the operator station are suspended with respect to the frame by the suspension unit.

33. The lawn mower of claim 31 and further comprising drive wheels, and wherein the at least one handle controls at least one of direction, speed, and braking of the drive wheels.

34. The lawn mower of claim 31 and further comprising a transmission, and wherein at least one trigger is moved to control a state of the transmission.

35. The lawn mower of claim 34 wherein the transmission includes at least one hydrostatic pump.

36. The lawn mower of claim 34 and further comprising at least one foot pedal and an axle rotatably coupled to the at least one foot pedal.

37. The lawn mower of claim 36 wherein the axle is rotatable by the at least one foot pedal to at least one of control a speed of the drive wheels and to return the transmission to neutral.

38. The lawn mower of claim 31 and further comprising a cutting deck, an engine deck, and a transmission deck each independently coupled to the frame.

39. The lawn mower of claim 31 and further comprising at least one support beam coupled to the operator station and the at least one pivot member.

40. The lawn mower of claim 39 and further comprising at least one handle support beam coupled to the at least one support beam.

41. The lawn mower of claim 40 wherein the at least one support beam and the at least one handle support beam are coupled to the suspension unit.

42. The lawn mower of claim 39 and further comprising at least one support plate coupled to the at least one support beam.

43. The lawn mower of claim 42 wherein the at least one support plate includes a first angled plate and a second angled plate upon which the operator's feet rest when the operator is positioned in the operator station.

44. The lawn mower of claim 31 wherein the at least one pivot member includes at least one pivot bar shaped to extend substantially horizontally and then diagonally rearward and downward.

45. The lawn mower of claim 31 and further comprising at least one leg support.

46. The lawn mower of claim 45 wherein the at least one leg support is coupled to the operator station, the at least one leg support and the operator station being suspended with respect to the frame by the suspension unit.

47. The lawn mower of claim 31 and further comprising a stop bar coupled to the frame and a stop member coupled to the operator station, the stop bar engaging the stop member to prevent movement of the operator station beyond a lowermost position.

48. The lawn mower of claim 47 wherein the stop bar substantially prevents the lawn mower from tipping over backwards.

49. The lawn mower of claim 31 and further comprising at least one foot and leg protection plate coupled to the at least one pivot member.

50. The lawn mower of claim 31 and further comprising an operator presence sensor coupled to the operator station.

51. The lawn mower of claim 50 and further comprising a safety interlock circuit in electrical communication with the operator presence sensor, the safety interlock circuit shutting down an engine of the lawn mower if the operator is not contacting the operator station.

52. A lawn mower for use by an operator having a body weight, the lawn mower comprising:
   a frame located within a substantially horizontal plane;
   a first drive wheel and a second drive wheel positioned along a drive axis, the drive axis located within a substantially vertical plane, the first drive wheel and the second drive wheel being independently controlled to provide a substantially zero-turn radius for the lawn mower; and
   a seat positioned at least partially between the first drive wheel and the second drive wheel and at least partially along the drive axis, the seat including a rear portion positioned higher than a front portion in order to be declined with respect to the horizontal plane so that the operator's upper torso leans forward at an angle with respect to the vertical plane when the operator is sitting on the seat; and
   at least one leg support that is angled with respect to the horizontal plane so that a portion of the operator's body weight is supported by the at least one leg support when the operator is sitting on the seat and when the operator's legs contact the at least one leg support.

53. The lawn mower of claim 52 and further comprising a suspension unit, and wherein the seat and the at least one leg support are suspended with respect to the frame.

54. The lawn mower of claim 53 wherein the seat is suspended with respect to the frame so that motion of the operator with respect to the frame when sitting on the seat is substantially vertical.

55. The lawn mower of claim 52 and further comprising at least one handle coupled to the seat and suspended with respect to the frame.

56. The lawn mower of claim 52 and further comprising at least one foot rest coupled to the seat and suspended with respect to the frame.

57. The lawn mower of claim 52 wherein the seat is positioned with respect to the at least one leg support so that when the operator is sitting on the seat and the operator's legs are contacting the at least one leg support an angle between the operator's thighs and the operator's back is greater than about 90 degrees.

58. The lawn mower of claim 52 wherein the seat is positioned with respect to the at least one leg support so that when the operator is sitting on the seat and the operator's legs are contacting the at least one leg support a substantial portion of the operator's body weight is distributed between the operator's pelvis and the operator's knees.

59. The lawn mower of claim 52 wherein the seat is positioned with respect to the at least one leg support so that when the operator is sitting on the seat and the operator's legs are contacting the at least one leg support, the operator's back, shoulders, and neck are substantially aligned.

60. The lawn mower of claim 52 and further comprising a cutting deck, and wherein the operator mounts the seat from behind the cutting deck and from substantially behind the first drive wheel and the second drive wheel.

61. Outdoor power equipment for use by an operator having a body weight and for riding over uneven terrain, the outdoor power equipment comprising:
a frame;
a seat that supports at least a portion of the operator's body weight;
at least one handle coupled to the seat;
a suspension unit coupled between the frame and the seat; and
at least one pivot member having a first portion and a second portion, the first portion coupled to the frame at a pivot location forward of the seat, the second portion coupled to the seat,
the at least one pivot member allowing the seat and the at least one handle to move with respect to the frame while the suspension unit absorbs a portion of shock caused by riding over the uneven terrain.

62. The outdoor power equipment of claim 61 wherein the at least one handle and the seat are suspended with respect to the frame by the suspension unit.

63. The outdoor power equipment of claim 61 and further comprising drive wheels, and wherein the at least one handle controls at least one of direction, speed, and braking of the drive wheels.

64. The outdoor power equipment of claim 61 and further comprising a transmission, and wherein at least one trigger is moved to control a state of the transmission.

65. The outdoor power equipment of claim 64 wherein the transmission includes at least one hydrostatic pump.

66. The outdoor power equipment of claim 64 and further comprising at least one foot pedal and an axle rotatably coupled to the at least one foot pedal.

67. The outdoor power equipment of claim 66 wherein the axle is rotatable by the at least one foot pedal to at least one of control a speed of the drive wheels and to return the transmission to neutral.

68. The outdoor power equipment of claim 61 and further comprising at least one seat support beam coupled to the seat and the at least one pivot member.

69. The outdoor power equipment of claim 68 and further comprising at least one handle support beam coupled to the at least one seat support beam.

70. The outdoor power equipment of claim 69 wherein the at least one seat support beam and the at least one handle support beam are coupled to the suspension unit.

71. The outdoor power equipment of claim 69 and further comprising at least one seat support plate coupled to the at least one seat support beam.

72. The outdoor power equipment of claim 71 wherein the at least one seat support plate includes a first angled plate and a second angled plate upon which the operator's feet rest when the operator is sitting on the seat.

73. The outdoor power equipment of claim 61 wherein the at least one pivot member includes at least one pivot bar shaped to extend substantially horizontally and then diagonally rearward and downward.

74. The outdoor power equipment of claim 61 and further comprising at least one leg support.

75. The outdoor power equipment of claim 74 wherein the at least one leg support is coupled to the seat, the at least one leg support and the seat being suspended with respect to the frame by the suspension unit.

76. The outdoor power equipment of claim 62 and further comprising a stop bar coupled to the frame and a stop member coupled to the seat, the stop bar engaging the stop member to prevent movement of the seat beyond a lowermost position.

77. The outdoor power equipment of claim 76 wherein the stop bar substantially prevents the lawn mower from tipping over backwards.

78. The outdoor power equipment of claim 61 and further comprising at least one foot and leg protection plate coupled to the at least one pivot member.

79. The outdoor power equipment of claim 61 and further comprising an operator presence sensor coupled to the seat.

80. The outdoor power equipment of claim 79 and further comprising a safety interlock circuit in electrical communication with the operator presence sensor, the safety interlock circuit shutting down an engine of the outdoor power equipment if the operator is not contacting the seat.

81. Outdoor power equipment for use by an operator having a body weight, the outdoor power equipment comprising:
a frame located within a substantially horizontal plane;
a first drive wheel and a second drive wheel positioned along a drive axis, the drive axis located within a substantially vertical plane;
a seat positioned at least partially between the first drive wheel and the second drive wheel and at least partially along the drive axis, the seat being angled with respect to the horizontal plane so that the operator's upper torso leans forward at an angle with respect to the vertical plane when the operator is sitting on the seat; and
at least one leg support that is angled with respect to the horizontal plane so that a portion of the operator's body weight is supported by the at least one leg support when the operator is sitting on the seat and when the operator's legs contact the at least one leg support.

82. Outdoor power equipment for use by an operator having a body weight and for riding over uneven terrain, the outdoor power equipment comprising:

a frame;

an operator station that supports at least a portion of the operator's body weight;

at least one handle coupled to the operator station;

a suspension unit coupled between the frame and the operator station; and at least one pivot member having a first portion and a second portion, the first portion coupled to the frame at a pivot location forward of the operator station, the second portion coupled to the operator station, the at least one pivot member allowing the operator station and the at least one handle to move with respect to the frame while the suspension unit absorbs a portion of shock caused by riding over the uneven terrain.

* * * * *

UNITED STATES PATENT AND TRADEMARK OFFICE
CERTIFICATE OF CORRECTION

PATENT NO. : 7,942,224 B2  
APPLICATION NO. : 12/214023  
DATED : May 17, 2011  
INVENTOR(S) : Marshall et al.

It is certified that error appears in the above-identified patent and that said Letters Patent is hereby corrected as shown below:

Col. 8, line 14: Claim 12 - the word "scat" should be "seat"

Col. 12, line 34: Claim 76 - the number "62" should be "61"

Signed and Sealed this

Second Day of August, 2011

David J. Kappos
*Director of the United States Patent and Trademark Office*